US012720187B2

(12) United States Patent
Kukkal et al.

(10) Patent No.: US 12,720,187 B2
(45) Date of Patent: Aug. 25, 2026

(54) IDENTIFYING CAMERA ACCESSORIES AND OPTIMIZING A PHOTO EXPERIENCE

(71) Applicant: Sony Group Corporation, Tokyo (JP)

(72) Inventors: Prisha Kukkal, San Diego, CA (US); Marvin DeMerchant, San Diego, CA (US); David Young, Poway, CA (US); James R. Milne, San Diego, CA (US)

(73) Assignee: SONY GROUP CORPORATION, Tokyo (JP)

( * ) Notice: Subject to any disclaimer, the term of this patent is extended or adjusted under 35 U.S.C. 154(b) by 57 days.

(21) Appl. No.: 18/823,015

(22) Filed: Sep. 3, 2024

(65) Prior Publication Data

US 2026/0067559 A1 Mar. 5, 2026

(51) Int. Cl.
*H04N 23/63* (2023.01)
*H04N 23/55* (2023.01)
*H04N 23/60* (2023.01)

(52) U.S. Cl.
CPC ........... *H04N 23/631* (2023.01); *H04N 23/55* (2023.01); *H04N 23/64* (2023.01)

(58) Field of Classification Search
CPC ....... H04N 23/631; H04N 23/55; H04N 23/64
See application file for complete search history.

(56) References Cited

U.S. PATENT DOCUMENTS 11,509,817 B2 11/2022 Gove
2018/0224720 A1* 8/2018 Pan ........................ H04N 23/60
2022/0150404 A1* 5/2022 Min ........................ H04N 23/55
2022/0174207 A1* 6/2022 Shigeta .................. H04N 23/67
2023/0300439 A1* 9/2023 Cotoros ................. H04N 23/81
348/207.99

FOREIGN PATENT DOCUMENTS

JP 2016025482 2/2016

OTHER PUBLICATIONS

Xu Sun et al.; An LED Detection and Recognition Method Based on Deep Learning in Vehicle Optical Camera Communication; Jun. 10, 2021; College of Communication Engineering, Jilin University, Changchun 130012, China; https://ieeexplore.ieee.org/stamp/stamp.jsp?arnumber=9444430.

* cited by examiner

*Primary Examiner* — Gevell V Selby
(74) *Attorney, Agent, or Firm* — Trellis IP Law Group, PC

(57) ABSTRACT

A camera application receives identifying information associated with a camera accessory for a camera. The camera application determines a unique identifier of the camera accessory based on the identifying information. The camera application provides the unique identifier of the camera accessory and a unique identifier of the camera to a machine-learning model. The machine-learning model outputs one or more optimization parameters associated with the camera accessory. The one or more optimization parameters guide a user on how to use the camera accessory with the camera. The camera application generates graphical data for displaying a user interface that includes the one or more optimization parameters. The camera application applies the one or more optimization parameters.

17 Claims, 7 Drawing Sheets

Generate, with the query engine, training queries 604

Compare the training queries to the groundtruth queries to generate a loss function 606

Modify parameters of the query engine to reduce the loss function 608

700

Receive identifying information associated with a camera accessory for a camera 702

Determine a unique identifier of the camera accessory based on the identifying information 704

Provide the unique identifier of the camera accessory and a unique identifier of the camera to a machine-learning model 706

Output, with the machine-learning model, one or more optimization parameters associated with the camera accessory, where the one or more optimization parameters guide a user on how to use the camera accessory with the camera 708

Generate graphical data for displaying a user interface that includes the one or more optimization parameters 710

Apply the one or more optimization parameters 712

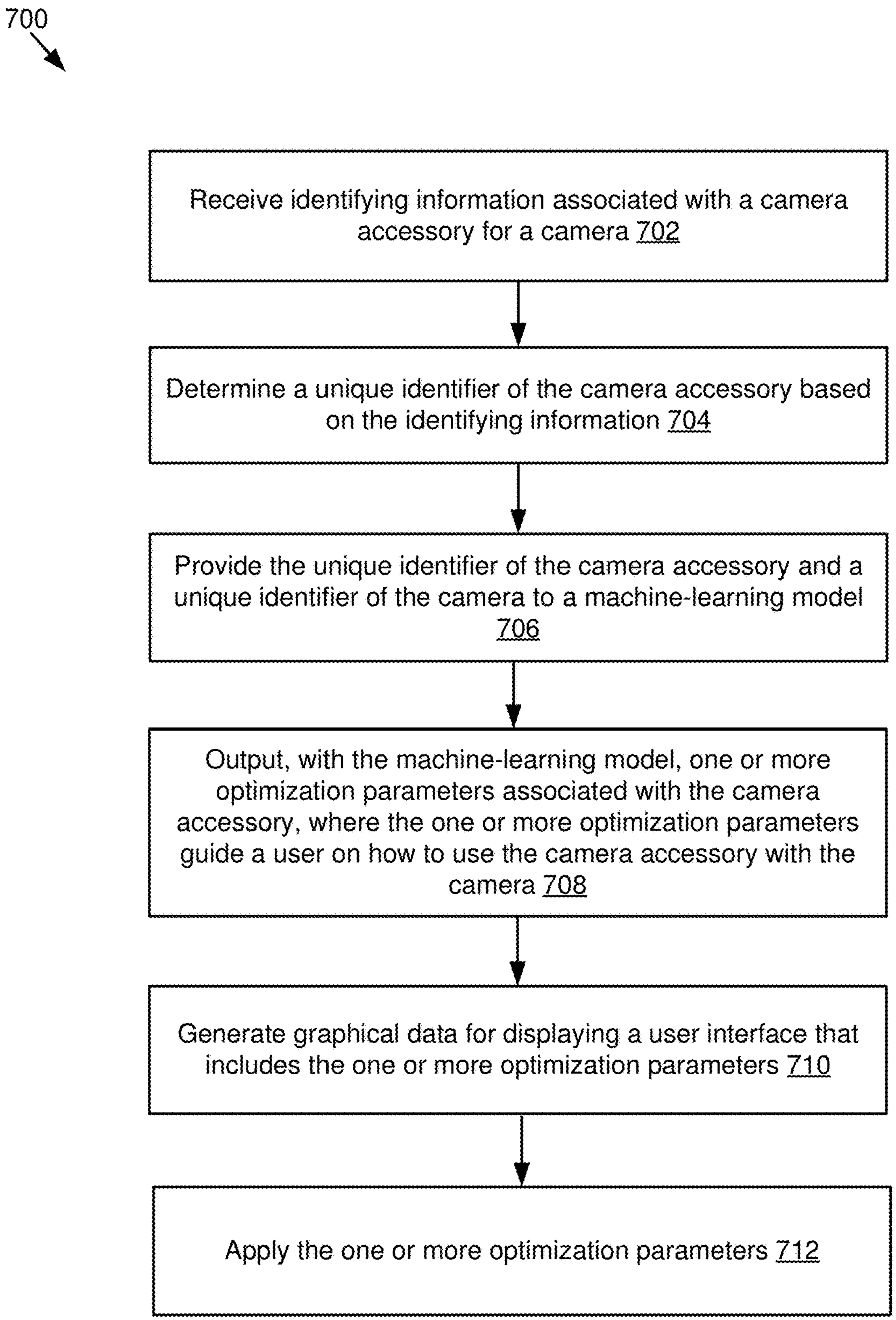

FIG 7

IDENTIFYING CAMERA ACCESSORIES AND OPTIMIZING A PHOTO EXPERIENCE

BACKGROUND

Cameras cannot recognize non-powered accessories that are connected to them. As hardware gets increasingly complicated, users struggle with properly connecting camera accessories and understanding how they best work with the camera. For example, a neutral density filter that is attached to a camera lens work best if the shutter speed is reduced by half of the camera's previous shutter speed. A user may find it difficult to identify the camera's current shutter and calculate a new shutter speed manually.

SUMMARY

A computer-implemented method includes receiving identifying information associated with a camera accessory for a camera. The method further includes determining a unique identifier of the camera accessory based on the identifying information. The method further includes providing the unique identifier of the camera accessory and a unique identifier of the camera to a machine-learning model. The method further includes outputting, with the machine-learning model, one or more optimization parameters associated with the camera accessory, wherein the one or more optimization parameters guide a user on how to use the camera accessory with the camera. The method further includes generating graphical data for displaying a user interface that includes the one or more optimization parameters. The method further includes applying the one or more optimization parameters.

In some embodiments, providing the unique identifier of the camera accessory and the unique identifier of the camera to the machine-learning model further includes providing an input image of a scene captured by the camera, wherein the one or more optimization parameters are associated with features from the input image. In some embodiments, the one or more optimization parameters are selected from a group of a camera setting, a camera preset, a custom button, or combinations thereof. In some embodiments, the method further includes capturing the identifying information with a lens of the camera, wherein determining the identification of the camera accessory is based on an image of the camera accessory.

In some embodiments, wherein the camera accessory is a filter selected from a group of a neutral density filter, a color filter, a graduated density filter, an ultraviolet filter, and combinations thereof, and the method further includes determining a shutter speed or a white balance of the camera, wherein the one or more optimization parameters include a camera setting that includes the shutter speed for the camera while the filter is attached to a lens of the camera. In some embodiments, the camera accessory is a flash and the method further includes determining a shutter speed of the camera, wherein the one or more optimization parameters include a camera setting that includes the shutter speed while the flash is associated with the camera.

In some embodiments, the method further includes providing the user interface that includes the one or more optimization parameters as option; and receiving a selection from the user of the one or more optimization parameters, wherein applying the one or more optimization parameters occurs responsive to receiving the selection from the user. In some embodiments, the user interface is provided on a mobile device, the mobile device is a separate piece of hardware from the camera, and the camera wirelessly communicates with the mobile device.

In some embodiments, the method further includes providing the user interface that includes the one or more optimization parameters as an option; receiving modification of the one or more optimization parameters from the user; receiving a selection from the user of the one or more modified optimization parameters, wherein applying the one or more optimization parameters occurs responsive to receiving the selection from the user; and responsive to a subsequent identification of the camera accessory, providing the modified optimization parameter as the option. In some embodiments, the one or more optimization parameters include a first optimization parameter from a set of optimization parameters and the method further includes: providing the user interface that includes the set of optimization parameters as options; receiving a selection of the first optimization parameter, wherein applying the one or more optimization parameters occurs responsive to receiving the selection from the user; and responsive to a subsequent identification of the camera accessory, providing the first optimization parameter as a default option. In some embodiments, the camera accessory is a first camera accessory, the one or more optimization parameters are one or more first optimization parameters, and the method further includes: receiving identifying information associated with a second camera accessory for the camera; determining a unique identifier of the second camera accessory based on the identifying information; providing the unique identifier of the second camera accessory to the machine-learning model; and outputting, with the machine-learning model, one or more second optimization parameters associated with the second camera accessory based on the unique identifier and the one or more first optimization parameters.

A system comprises one or more processors and logic encoded in one or more non-transitory media for execution by the one or more processors and when executed are operable to: receive identifying information associated with a camera accessory for a camera; determine a unique identifier of the camera accessory based on the identifying information; provide the unique identifier of the camera accessory and a unique identifier of the camera to a machine-learning model; output, with the machine-learning model, one or more optimization parameters associated with the camera accessory, wherein the one or more optimization parameters guide a user on how to use the camera accessory with the camera; generate graphical data for displaying a user interface that includes the one or more optimization parameters; and apply the one or more optimization parameters.

In some embodiments, providing the unique identifier of the camera accessory and the unique identifier of the camera to the machine-learning model further includes providing an input image of a scene captured by the camera, wherein the one or more optimization parameters are associated with features from the input image. In some embodiments, the one or more optimization parameters are selected from a group of a camera setting, a camera preset, a custom button, or combinations thereof. In some embodiments, the operations further include capturing the identifying information with a lens of the camera, wherein determining the identification of the camera accessory is based on an image of the camera accessory.

Software encoded in one or more non-transitory computer-readable media for execution by one or more processors and when executed is operable to: receive identifying information associated with a camera accessory for a camera; determine a unique identifier of the camera accessory based on the identifying information; provide the unique identifier of the camera accessory and a unique identifier of the camera to a machine-learning model; output, with the machine-learning model, one or more optimization parameters associated with the camera accessory, wherein the one or more optimization parameters guide a user on how to use the camera accessory with the camera; generate graphical data for displaying a user interface that includes the one or more optimization parameters; and apply the one or more optimization parameters.

In some embodiments, providing the unique identifier of the camera accessory and the unique identifier of the camera to the machine-learning model further includes providing an input image of a scene captured by the camera, wherein the one or more optimization parameters are associated with features from the input image. In some embodiments, the one or more optimization parameters are selected from a group of a camera setting, a camera preset, a custom button, or combinations thereof. In some embodiments, the operations further include capturing the identifying information with a lens of the camera, wherein determining the identification of the camera accessory is based on an image of the camera accessory. In some embodiments, the camera accessory is a filter selected from a group of a neutral density filter, a color filter, a graduated density filter, an ultraviolet filter, and combinations thereof, and the operations further include determining a shutter speed or a white balance of the camera, wherein the one or more optimization parameters include a camera setting that includes the shutter speed for the camera while the filter is attached to a lens of the camera.

A further understanding of the nature and the advantages of particular embodiments disclosed herein may be realized by reference of the remaining portions of the specification and the attached drawings.

BRIEF DESCRIPTION OF THE DRAWINGS

FIG. 7 is a flowchart of an example method to use a machine-learning model to output one or more optimization parameters according to some embodiments described herein.

DETAILED DESCRIPTION OF EMBODIMENTS

The technology described below advantageously solves the problem of how to optimize performance of a camera accessory that is attached to a camera. A camera application receives identifying information associated with a camera accessory for a camera. The identifying information may be an image, a message sent through a wireless communication protocol, etc. The camera application determines a unique identifier of the camera accessory based on the identifying information. In some embodiments, a machine-learning model receives the image as input and outputs a unique identifier.

The camera application provides the unique identifier of the camera accessory and a unique identifier of the camera to a machine-learning model. In some embodiments, the machine-learning model also receives an image captured by the camera. The machine-learning model outputs one or more optimization parameters associated with the camera accessory. The one or more optimization parameters may include a camera setting, a camera preset, and/or a custom button. In some embodiments, the one or more optimization parameters are based on analyzing a scene in the image and providing one or more optimization parameters that improve the quality of captured images.

The camera application generates graphical data for displaying a user interface that includes the one or more optimization parameters. The camera application applies the one or more optimization parameters.

The camera application may be part of the camera or a mobile device. For example, the mobile device may display the user interface and include the machine-learning model because the mobile device includes more storage space for running the machine-learning model. In this example, the camera application on the mobile device may transmit a command to the camera to apply the one or more optimization parameters.

In some embodiments, the machine-learning model includes a query engine that combines request, the unique identifier for the camera accessory, and the unique identifier for the camera into a template that is provided to a large language model (LLM). The LLM outputs the one or more optimization parameters.

The camera application advantageously improves the performance of the camera while the camera is attached to the camera accessory. In some embodiments, the one or more optimization parameters are based on multiple camera accessories and how the camera accessories work with each other.

Example Environment 100

Figure 1:
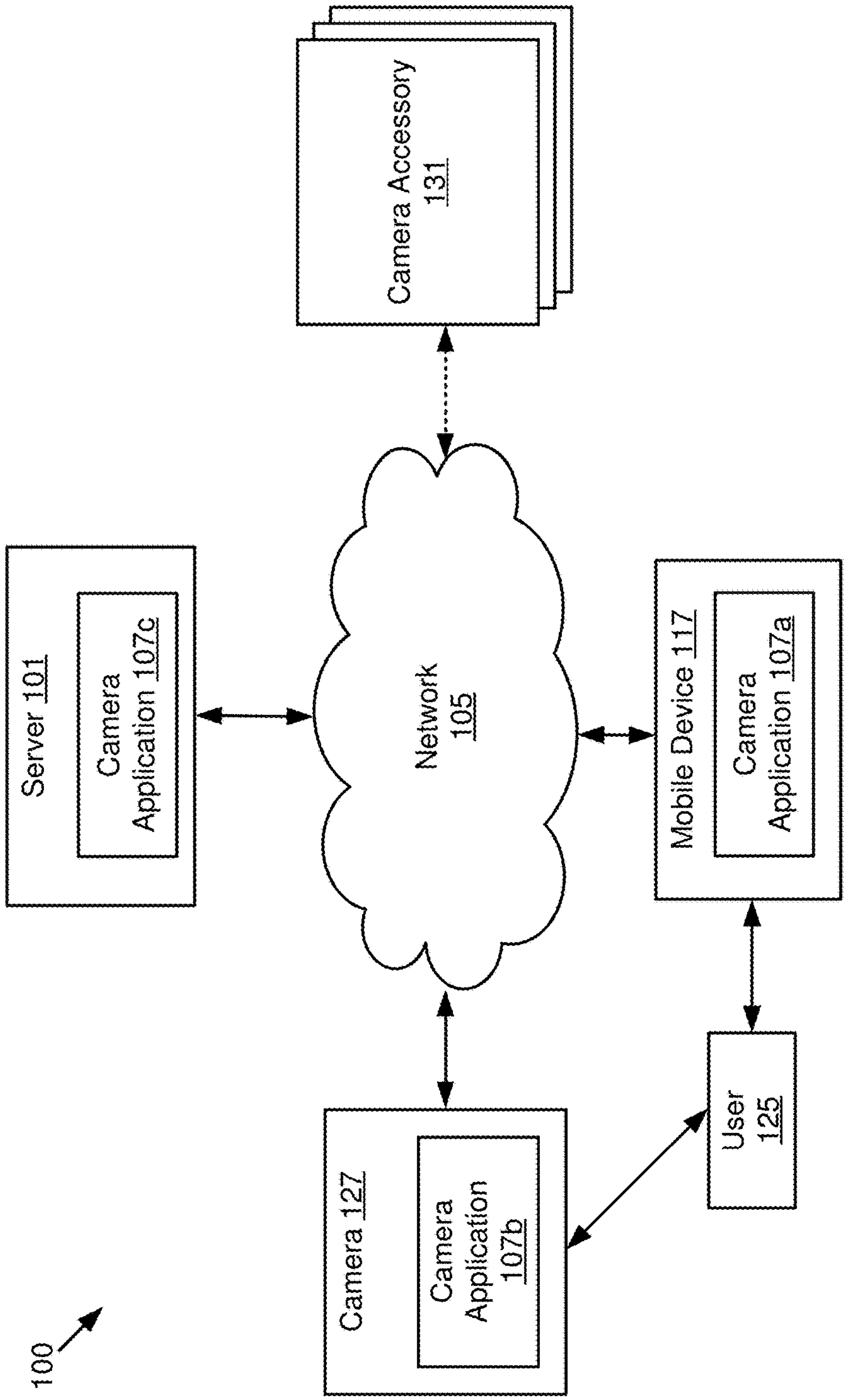
FIG. 1 is a block diagram of an example network environment according to some embodiments described herein.

FIG. 1 illustrates a block diagram of an example environment 100. In some embodiments, the environment 100 includes a mobile device 117, a camera 127, one or more camera accessories 131, and a server 101. In some embodiments, the environment 100 may include other servers or devices not shown in FIG. 1. In FIG. 1 and the remaining figures, a letter after a reference number, e.g., "107*a*," represents a reference to the element having that particular reference number (e.g., a camera application 107*a* stored on the mobile device 117). A reference number in the text without a following letter, e.g., "107," represents a general reference to embodiments of the element bearing that reference number (e.g., any camera application 107).

The mobile device 117 is a computing device that includes a memory, a hardware processor, and a camera application 107 (e.g., camera application 107*a*). The mobile device 117 may include a smartphone, a tablet computer, a laptop, a mobile telephone, a wearable device, a head-mounted display, a mobile email device, or another electronic device capable of accessing a network 105 to communicate with one or more of the camera 127, the wireless device 120, and the server 101. The mobile device 117 is associated with a user 125.

The mobile device 117 may be coupled to the network 105 wirelessly using Wi-Fi®, Bluetooth®, or other wireless technology. The mobile device 117 is used by way of example. While FIG. 1 illustrates one mobile device 117, the disclosure applies to a system architecture having one or more mobile devices 117.

The mobile device 117 includes a display. For example, if the mobile device 117 is a smartphone, the smartphone may include a touch-sensitive display that displays a user interface for a user. The user interface may display options for scanning a QR code, displaying one or more optimization parameters, configuring presets, etc. In some embodiments, the mobile device 117 includes a camera.

The camera 127 includes a processor, a memory, a speaker, a display, and network communication hardware. The camera 127 may be a digital Single Lens Reflex (dSLR) camera, an SLR camera, a large-format camera, a medium-format camera, a rangefinder camera, a video camera such as a camcorder, a camera that is part of a smartphone, etc. The camera 127 may also include a display that displays a user interface for a user 125.

The camera 127 may connect to the network 105 through a wired connection, such as Ethernet, coaxial cable, fiber-optic cable, etc., or a wireless connection, such as Wi-Fi®, Bluetooth®, or other wireless technology.

The camera 127 includes a camera application 107*b*. In some embodiments, the camera application 107*b* implements one or more optimization parameters determined by the camera application 107*a* from the mobile device 117 or the camera application 107*b* determines the optimization parameters itself.

The camera accessory 131 is a hardware device that attaches to the camera 127 or the mobile device 117. For example, the camera accessory 131 may include a filter, a flash, a gimble, a tripod, a selfie stick, a lens hood, a microphone, a remote control, etc. The camera accessory 131 may be physically attached to the camera 127 (e.g., as in the case of a filter) or wirelessly attached (e.g., as in the case of a remote control), which is illustrated with a dashed arrow to show that the wireless communication is optional. The camera accessory 131 may be composed of a material, such as plastic, and has no wireless capabilities with which to communicate with the camera application 107.

In some embodiments, the camera accessory 131 includes hardware that provides identifying information to the camera application 107. The identifying information may include a unique identifier that is visible on the camera accessory 131 and is identifiable from an image of the camera accessory 131, such as a QR code or a barcode. In some embodiments, the camera accessory 131 includes wireless hardware for communicating with the camera application 107. The identifying information may be transmitted via a wireless protocol, such as Wi-Fi®, Bluetooth®, Near Field Communication (NFC), Radio Frequency Identification (RFID), Ultra-Wideband (UWB), Request for Information (RFI), etc.

A camera accessory 131 may not have a means for identifying the camera accessory 131. For example, the camera accessory 131 may be a plastic tripod with no barcodes, RFID tags, etc. In some embodiments, a user may add a sticker to the camera accessory 131 that includes identifying information and associated the identifying information with the camera accessory 131 through a user interface provided by the camera application 107 or another application. For example, the user may add an NFC sticker to the camera accessory 131.

The server 101 includes a processor, a memory, and network communication hardware. In some embodiments, the server 101 is a hardware server. The server 101 is communicatively coupled to the network 105 via a wired connection, such as Ethernet, coaxial cable, fiber-optic cable, etc., or a wireless connection, such as Wi-Fi®, Bluetooth®, or other wireless technology. In some embodiments, the server 101 includes a camera application 107*c*. In some embodiments and with user consent, the camera application 107*c* on the server 101 maintains a copy of user profiles, training data for a machine-learning model, etc.

In some embodiments, the camera application 107*c* on the server 101 includes the trained machine-learning model and provides information to the camera 127 and/or the mobile device 117 to take advantage of greater processing power provided by the server 101.

In some embodiments, the camera application 107 includes logic that is operable to receive identifying information associated with a camera accessory for a camera. The camera application 107 determines a unique identifier of the camera accessory based on the identifying information. The camera application 107 provides the unique identifier of the camera accessory 131 and a unique identifier of the camera 127 to a machine-learning model. The machine-learning model outputs one or more optimization parameters associated with the camera accessory 131 based on the unique identifier, wherein the one or more optimization parameters guide a user on how to use the camera accessory 131 with the camera 127. The camera application 107 applies the one or more optimization parameters.

Example Computing Device 200

Figure 2:
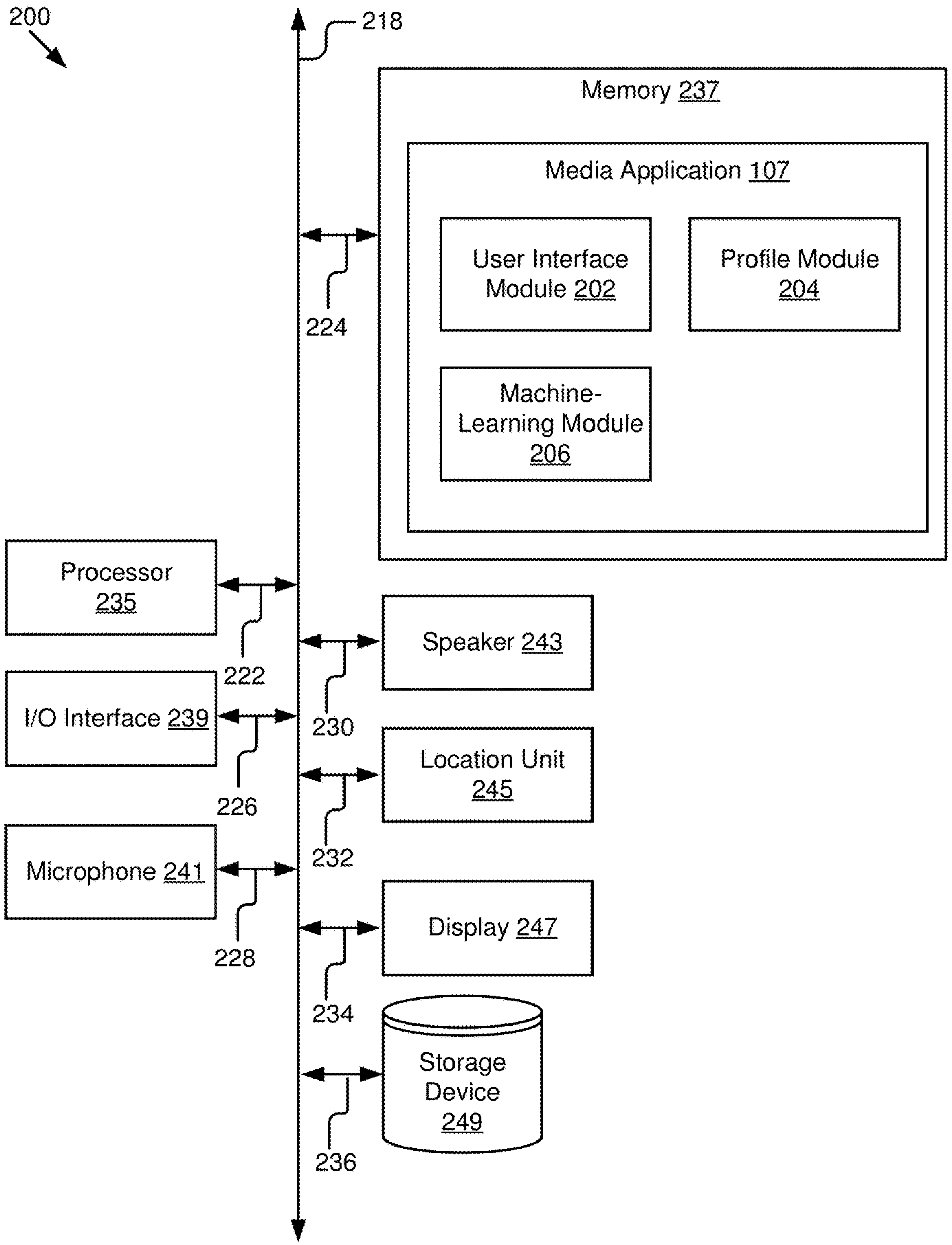
FIG. 2 is a block diagram of an example computing device according to some embodiments described herein.

FIG. 2 is a block diagram of an example computing device 200 that may be used to implement one or more features described herein. The computing device 200 can be any suitable computer system or other electronic or hardware device. In some embodiments, the computing device 200 is the camera 127 in FIG. 1. In some embodiments, the computing device 200 is the mobile device 117 in FIG. 1. In some embodiments, some portions of the computing device 200 are performed by one or more of the camera 127, the mobile device 117, and/or the server 101 in FIG. 1.

In some embodiments, computing device 200 includes a processor 235, a memory 237, an Input/Output (I/O) interface 239, a microphone 241, a speaker 243, a location unit 245, a display 247, and a storage device 249. The processor 235 may be coupled to a bus 218 via signal line 222, the memory 237 may be coupled to the bus 218 via signal line 224, the I/O interface 239 may be coupled to the bus 218 via signal line 226, the microphone 241 may be coupled to the bus 218 via signal line 228, the speaker 243 may be coupled to the bus 218 via signal line 230, the location unit 245 may be coupled to the bus 218 via signal line 232, the display 247 may be coupled to the bus 218 via signal line 234, and the storage device 249 may be coupled to the bus 218 via signal line 236.

The processor 235 can be one or more processors and/or processing circuits to execute program code and control basic operations of the computing device 200. A processor includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, or other systems. A computer may be any processor in communication with a memory.

The memory 237 is typically provided in computing device 200 for access by the processor 235 and may be any suitable processor-readable storage medium, such as random access memory (RAM), read-only memory (ROM), Electrical Erasable Read-only Memory (EEPROM), Flash memory, etc., suitable for storing instructions for execution by the processor or sets of processors, and located separate from processor 235 and/or integrated therewith. Memory 237 can store software operating on the computing device 200 by the processor 235, including the camera application 107.

The I/O interface 239 can provide functions to enable interfacing the computing device 200 with other systems and devices. Interfaced devices can be included as part of the computing device 200 or can be separate and communicate with the computing device 200. For example, network communication devices, storage devices (e.g., the memory 237 or the storage device 249), and I/O devices can communicate via the I/O interface 239.

In some embodiments, the I/O interface 239 handles communication between the computing device 200 and other devices in a network (e.g., the mobile device 117, the server 101, the wireless device 120, the camera 127, etc.) via a wireless protocol, such as Wi-Fi®, Bluetooth®, Near Field Communication (NFC), Radio Frequency Identification (RFID), Ultra-Wideband (UWB), Request for Information (RFI), infrared, etc.

The microphone 241 includes hardware for detecting sounds. For example, the microphone 241 may detect people speaking. The speaker 243 produces an audio signal that is heard by the user.

The location unit 245 includes hardware to identify a current location of the computing device 200. The location unit 253 includes one or more of a global positioning system (GPS), Bluetooth®, Wi-Fi®, NFC, RFID, UWB, RFI, and infrared. The display 247 may connect to the I/O interface 239 to display content, e.g., a user interface, and to receive touch (or gesture) input from a user. The display 247 can include any suitable display device such as a liquid crystal display (LCD), light emitting diode (LED), or plasma display screen, television, monitor, touchscreen, or other visual display device.

The storage device 249 stores data related to the camera application 107. For example, the storage device 249 may store user profiles generated by the camera application 107, training data for a machine-learning model, etc.

Although particular components of the computing device 200 are illustrated, other components may be added or removed.

Example Camera Application 107

The camera application 107 includes a user interface module 202, a profile module 204, and a machine-learning module 206. Different modules may be stored on different types of computing devices. For example, a first computing device 200 may be a mobile device 117 that includes the user interface module 202 and the machine-learning module 206, and a second computing device 200 may be a camera 127 that includes the profile module 204.

The user interface module 202 generates graphical data for displaying a user interface. In some embodiments, a user downloads the camera application 107 onto a mobile device **117*a* or uses the camera application 107*b* stored on a camera 127. The user interface module 202 may generate graphical data for displaying a user interface that is used to aid in identifying a camera accessory 131. For example, the user interface may guide a user to capture an image of the camera accessory 131** or a subset of the image of the camera accessory, such as a portion of the image that corresponds to a QR code or a barcode.

The user interface module 202 receives identifying information associated with a camera accessory 131 for a camera 127. For example, the user interface module 202 may receive a scanned QR code from the user interface module 202, identifying information received via a wireless protocol, etc. In some embodiments, a user provides identifying information, such as a serial number entered manually into a user interface.

The user interface module 202 determines a unique identifier associated with a camera accessory 131 based on the identifying information. For example, the user interface module 202 may determine the unique identifier based on information that is part of the RFID tag, an NFC tag, a Bluetooth communication, etc. where a packet includes the unique identifier associated with the camera 127.

In some embodiments, the identifying information is an image and the user interface module 202 provides the image as input to the machine-learning module 206, which includes a machine-learning model that is trained to receive the image and output a unique identifier. The image may include a page that includes purchasing information, an image of the camera accessory 131, etc.

The unique identifier is used by the machine-learning module 206 to identify the name of the camera 127, the manufacturer, the model number, the serial number, the year it was built, or any other information needed to output one or more optimization parameters. In some embodiments, the user interface module 202 provides the unique identifier for the camera accessory 131 and the unique identifier for the camera 127 to the profile module 204 and the machine-learning module 206.

Figure 3:
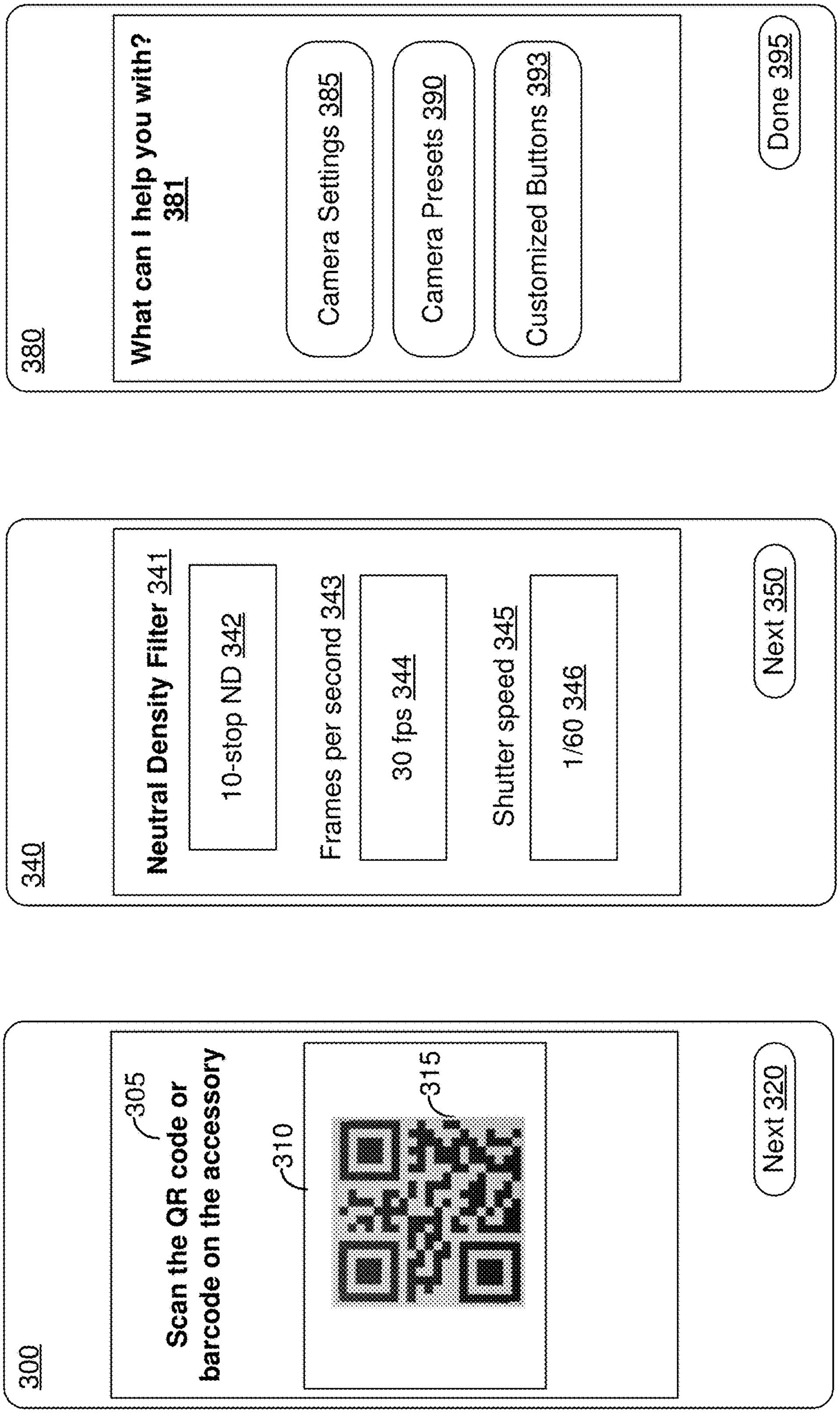
FIG. 3 illustrates example user interfaces for scanning a unique identifier associated with a camera accessory, providing camera settings for a neutral density filter, and providing options for different types of optimization parameters to be configured according to some embodiments described herein.

FIG. 3 illustrates an example first user interface 300 for scanning a unique identifier associated with a camera accessory 131 according to some embodiments. In some embodiments, the first user interface 300 is displayed on a mobile device 117. The first user interface 300 includes instructions 305 for how to capture a QR code or barcode through the viewfinder 310 (e.g., "Scan the QR code or barcode on the accessory"). In this example, a user aims a mobile device 117 at a QR code 315. The mobile device 117 may automatically capture an image of the QR code 315 once the QR code 315 is identifiable or once the user selects the next button 320.

Responsive to the camera accessory 131 being identified, the user interface module 202 generates graphical data for displaying a user interface that includes one or more optimization parameters. The one or more optimization parameters may include a camera setting, a camera preset, and/or a custom button.

The camera setting may include different camera settings that are optimized for a camera accessory 131. For example, if the camera accessory 131 is a gimbal, the camera setting may identify a center of gravity relative to the gimbal. In some embodiments, the camera setting is automatically applied to the camera 127. The camera preset may include a preset that is associated with a particular scene, such as an indoor scene or an outdoor scene, sunset, dawn, etc. The camera preset may be for using a particular filter during a video shoot or for discrete images. The camera preset may be selected from a set of prepopulated camera presets. The custom button may be generated based on particular information provided by a user, such as camera settings corresponding to a particular distance, based on wanting a particular ISO, based on combining multiple camera accessories 131, etc.

If the camera accessory 131 is a filter, such as a neutral density filter, a color filter, a graduated density filter, and/or an ultraviolet filter, the camera setting may include a shutter speed or a white balance of the camera. For example, the shutter speed or aperture may be helpful for a neutral density filter and the white balance may be helpful for a color filter. In some embodiments, the machine-learning module 206 receives initial values associated with the camera 127, such as an initial shutter speed, and the camera setting is calculated based on the initial shutter speed and the filter. For example, if the starting shutter speed is 1/125s and the filter is ND1000 (i.e., a 10-stop filter), the new camera setting output by the machine-learning model is a shutter speed of 8 s (providing the ISO and aperture remain constant).

If the camera accessory 131 is a flash, the machine-learning model may receive a shutter speed associated with the camera 127. The machine-learning model may output an optimization parameter that includes a shutter speed while the flash is associated with the camera 127.

The user interface module 202 provides the user interface that includes the one or more optimization parameters to a display 247. FIG. 3 includes a second user interface 340 of camera settings where the camera accessory 131 is a neutral density filter 341 according to some embodiments described herein. In some embodiments, the second user interface 340 may be displayed on a mobile device 117. In this example, the neutral density filter is a 10-stop neutral density filter 343. As a result, the machine-learning model output camera settings that includes frames per second of 30 frames per second 344 and a shutter speed 345 of 1/60$^{th}$ 346.

In some embodiments, the user interface module 202 receives identifying information for a first camera accessory 131, determines a unique identifier of the first camera accessory 131, provides the unique identifier to the machine-learning module 206, and displays one or more first optimization parameters related to the first camera accessory 131. In some embodiments, the user interface module 202 receives identifying information for a second camera accessory 131, determines a unique identifier of the second camera accessory 131, provides the unique identifier to the machine-learning module 206, and displays one or more second optimization parameters related to the second camera accessory 131 and the one or more first optimization parameters.

In some embodiments, the user interface module 202 receives a selection from a user of the one or more optimization parameters. If the user interface module 202 is on the camera 127, the user interface module 202 commands the camera 127 to apply the one or more optimization parameters. If the user interface module 202 is on the mobile device 117, the user interface module 202 may transmit a command to the camera 127 via the I/O interface 239 to apply the one or more optimization parameters.

In some embodiments, the user interface module 202 generates a user interface that includes options for modifying an optimization parameter. For example, a user may be able to create customized optimization parameters.

FIG. 3 includes a third user interface 380 that provides options for different types of optimization parameters to be modified according to some embodiments described herein. In some embodiments, the third user interface 380 is displayed on a mobile device 117. The third user interface 380 includes a camera settings button 385, a camera presets button 390, and a customized buttons button 393.

Selecting each of the buttons causes the user interface module 202 to update the user interface to include information about how to modify the selected optimization parameter. For example, if a user consistently uses two different flashes, the user may select a custom button that combines information about the two different flashes. The custom button may appear automatically each time the user interface module 202 subsequently identifies the camera accessories 131.

In another example, a user may prefer to capture images at a particular distance, such as a near focus distance of 10 feet. The custom button may display different camera settings that the machine-learning model determined are ideal when the user captures images at 10 feet. The custom button may then be saved as a customization that appears responsive to the user interface module 202 identifying the corresponding camera accessory 131. In another example, a user may set a power setting for multiple flash camera accessories 131, which results in a custom button that specifies a corresponding shutter speed.

In some embodiments, user interface module 202 generates a user interface that includes options for selecting a first optimization parameter from a set of optimization parameters. For example, the user interface module 202 may include options for saving camera settings and/or camera presets as favorites. If a user selects the first optimization parameter from a set of optimization parameters, the first optimization parameter icon may appear automatically each time the user interface module 202 subsequently identifies the camera accessories 131.

In some embodiments, responsive to a user selecting the customized buttons button 393, the user interface module 202 displays a user interface where a user may provide initial camera settings. The initial camera settings may be input using a drop-down menu, a text field, etc. For example, a user may specify that they want a particular level of stabilization associated with a selfie stick for capturing images on a mobile device 117.

Figure 4:
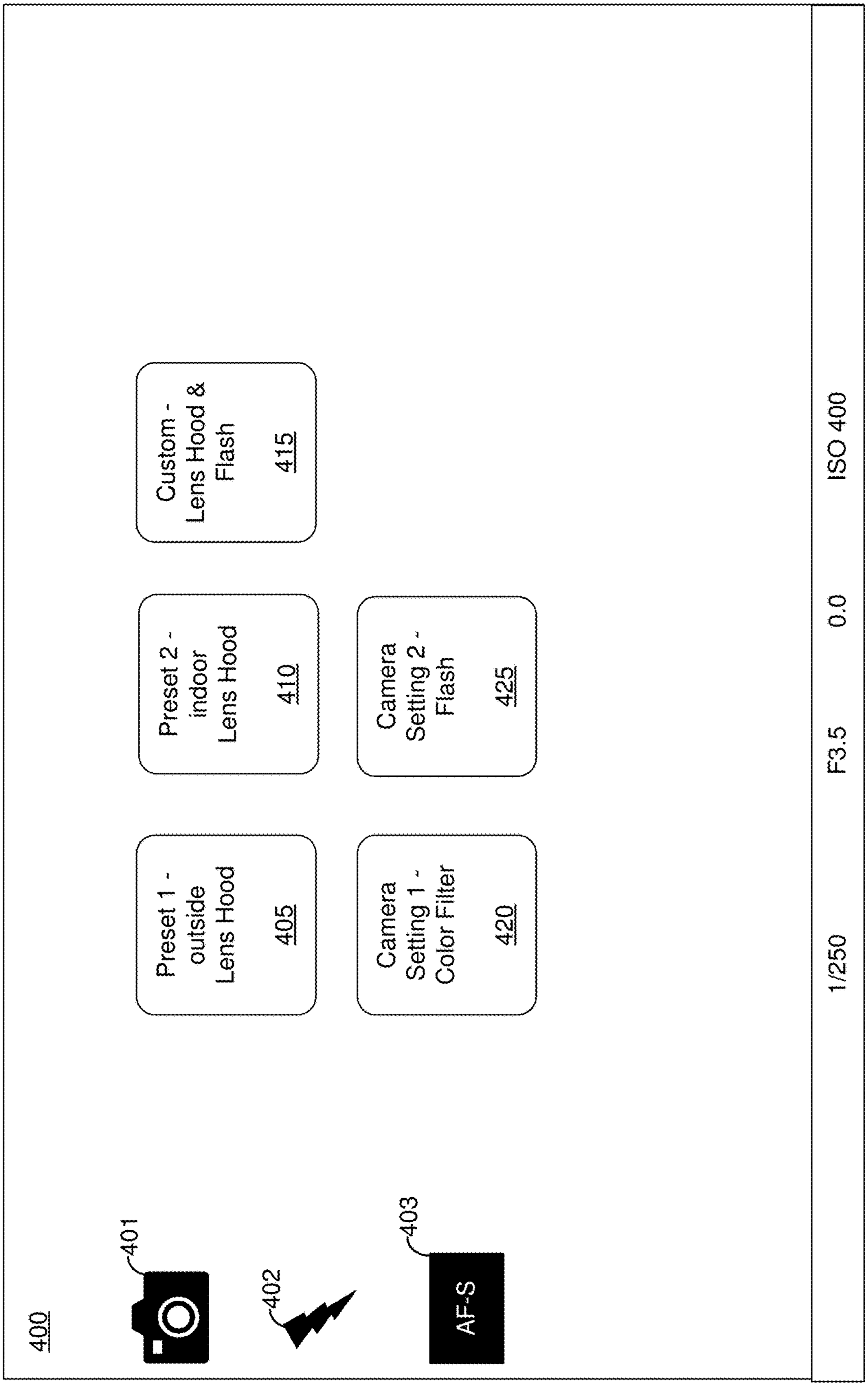
FIG. 4 illustrates an example user interface for a camera that includes an optimization parameter according to some embodiments described herein.

FIG. 4 illustrates an example user interface 400 for a camera 127 that includes an optimization parameter according to some embodiments described herein. The user interface 400 includes standard settings for a camera 127, such as a camera icon 401 to change the viewing mode, a flash icon 402 to enable flash, and an auto-focus single (AF-S) icon 403 to show that the settings are enabled for subject mode.

The user interface 400 includes optimization parameters. Preset 1 405 is designed for capturing images outside while using a lens hood as a camera accessory 131. Preset 2 410 is designed for capturing indoor images while using the lens hood as a camera accessory 131. The Custom Button 415 is designed for camera settings that combine two different camera accessories 131: a lens hood and a flash so that the multiple camera accessories 131 work well together. The Camera Setting 1 420 includes camera settings for a color filter. The Camera Setting 2 425 includes camera settings for a flash. In some embodiments, the user interface 400 includes optimization parameters for currently attached camera accessories 131. In some embodiments, the user interface 400 includes any optimization parameters that were previously used.

The profile module 204 associates a user profile with camera accessories 131, user preferences, and customizations. In some embodiments, once the user interface module 202 identifies a camera accessory 131, the profile module 204 receives the unique identifier from the user interface module 202 and associates the unique identifier with the user profile for the user. The profile module 204 updates the user profile responsive to user input, such as selecting a camera setting and/or a preset as a favorite and creating custom buttons. Responsive to the user interface module 202 subsequently identifying a camera accessory 131, the user interface module 202 displays a user interface that includes the configurations from the user profile.

In some embodiments, the machine-learning module 206 trains a machine-learning model to receive an image of a camera accessory and output a unique identifier associated with the camera accessory. In some embodiments, the image includes an image of the camera accessory 131, a QR code, a barcode, etc. The machine-learning model may be trained by providing pairs of images with corresponding unique identifiers associated with the images.

The machine-learning module 206 trains a machine-learning model to receive a unique identifier associated with a camera accessory 131 and a unique identifier associated with the camera 127, and output one or more optimization parameters. The one or more optimization parameters guide the user on how to use the camera accessory 131 with the camera 127. The one or more optimization parameters include a camera setting, a camera preset, and/or a custom button.

The machine-learning model may include a query engine and a large-language model (LLM). In some embodiments, the machine-learning module 206 trains the machine-learning model using training data. The training data may include unique identifiers associated with camera accessories, requests, and templates that are paired with groundtruth queries. The query engine generates training queries using the unique identifiers associated with camera accessories, requests, and templates. The training queries are compared to the groundtruth queries and the parameters of the query engine are modified to reduce the loss function.

Figure 5:
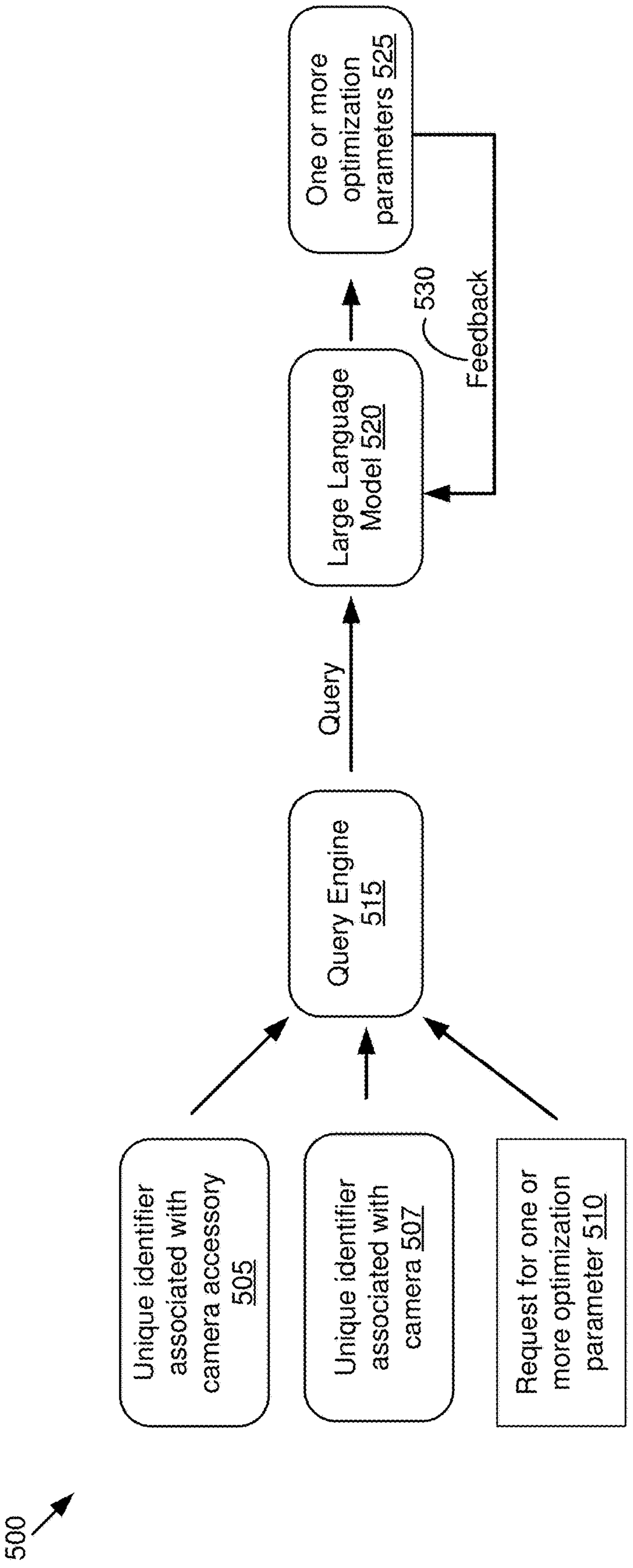
FIG. 5 illustrates an example architecture of a machine-learning model that outputs one or more optimization parameters according to some embodiments described herein.

FIG. 5 illustrates an example architecture 500 of a machine-learning model that satisfies requests from a user according to some embodiments described herein. The architecture 500 includes a query engine 515 that receives input information and generates a query. In some embodiments, the query engine 515 is a machine-learning model, such as a text-to-text transformer that processes natural language queries by combining different types of information into a template to form a query. The query is provided as input to a large language model 520. The large language model 520 outputs one or more optimization parameters based on the query.

The query engine 515 receives a unique identifier associated with a camera accessory 505, a unique identifier associated with a camera 507, and a request for one or more optimization parameters 510. The query engine 515 combines the unique identifier associated with the camera accessory 505, the unique identifier associated with the camera 507, the request for one or more optimization parameters 510, and a template to form a query. For example, for a single camera accessory 131, the query may include: "Your task is to provide <optimization parameters> that correspond to <unique identifier associated with camera accessory> that is used with <unique identifier associated with camera>." If multiple camera accessories are involved, the query may include: "Your task is to provide <optimization parameters> that correspond to <unique identifier associated with first camera accessory> and <unique identifier associated with second camera accessory> that are used with <unique identifier associated with camera>."

The large language model 520 outputs one or more optimization parameters 525 that correspond to the query. In some embodiments, the large language model 520 receives feedback 530 based on the one or more optimization parameters 525. For example, the feedback 530 may include a user stating that one or more optimization parameters 525 had conflicting settings, that the one or more optimization parameters resulted in low-quality images, etc. The machine-learning module 206 performs fine tuning of the large language model 520 responsive to receiving the feedback 530.

Large language models are built on natural language text. The query engine 515 and/or the large language model 520 may include learnable weights that are attached to a model layer. The learnable weights may use key and query in self-attention layers of the large language model 520. The loss function may be a cross-entropy loss function for maximizing the likelihood of a desired system response. In some embodiments, the query engine 515 and/or the large language model 520 are fine-tuned by adjusting hyperparameters, such as the number of epochs to train the model for, the batch size (i.e., the number of examples used in a single training pass), the learning rate at which the model weights are updated, and how much the model learns from prompt tokens versus completion tokens.

In some embodiments, the machine-learning model is a multi-modal machine-learning model that associates one or more optimization parameters with an image. For example, the machine-learning model may include the query engine 515 of FIG. 5 and a large language model that is trained to receive an image of a scene and output one or more optimization parameters that result in high-quality images being captured with the camera and the camera accessory.

In some embodiments, the machine-learning model includes an image embedder that encodes an input image. The encoded image is compared to an embedded space to identify a high-quality version of the features in the input image. The machine-learning model also includes a test encoder that encodes a query. The encoded query is compared to an embedded space to identify one or more optimization parameters that are associated with the high-quality version of the features in the input image.

During training, training data that includes groundtruth training data is compared to input images and queries. The groundtruth training data may include one or more optimization parameters that are associated with high-quality images. In some embodiments, the groundtruth training data includes images that were labeled by humans as being associated with a spectrum of quality, such as from 1-10. The one or more suggested optimization parameters are associated with the groundtruth one or more optimization parameters and the loss function is a difference between the suggested optimization parameters and the groundtruth optimization parameters. In some embodiments, the loss function determines a noise contrastive estimation (NCE) loss.

As a result of the multi-modal machine-learning model, one or more optimization parameters may be associated with different types of images. For example, the optimization parameters associated with a landscape image taken at sunset are different from the optimization parameters associated with a portrait of two people captured indoors.

In some embodiments, the process may be iterative where an image is captured, the camera accessory 131 is identified, one or more optimization parameters are captured, and the user captures a subsequent image. If the user is unhappy with the quality of the subsequent image, the user may modify a setting and start the process again and/or make modifications to the camera settings, capture a subsequent image, and continue the process until the user is satisfied with the quality of the subsequent image.

EXAMPLE METHODS

Figure 6:
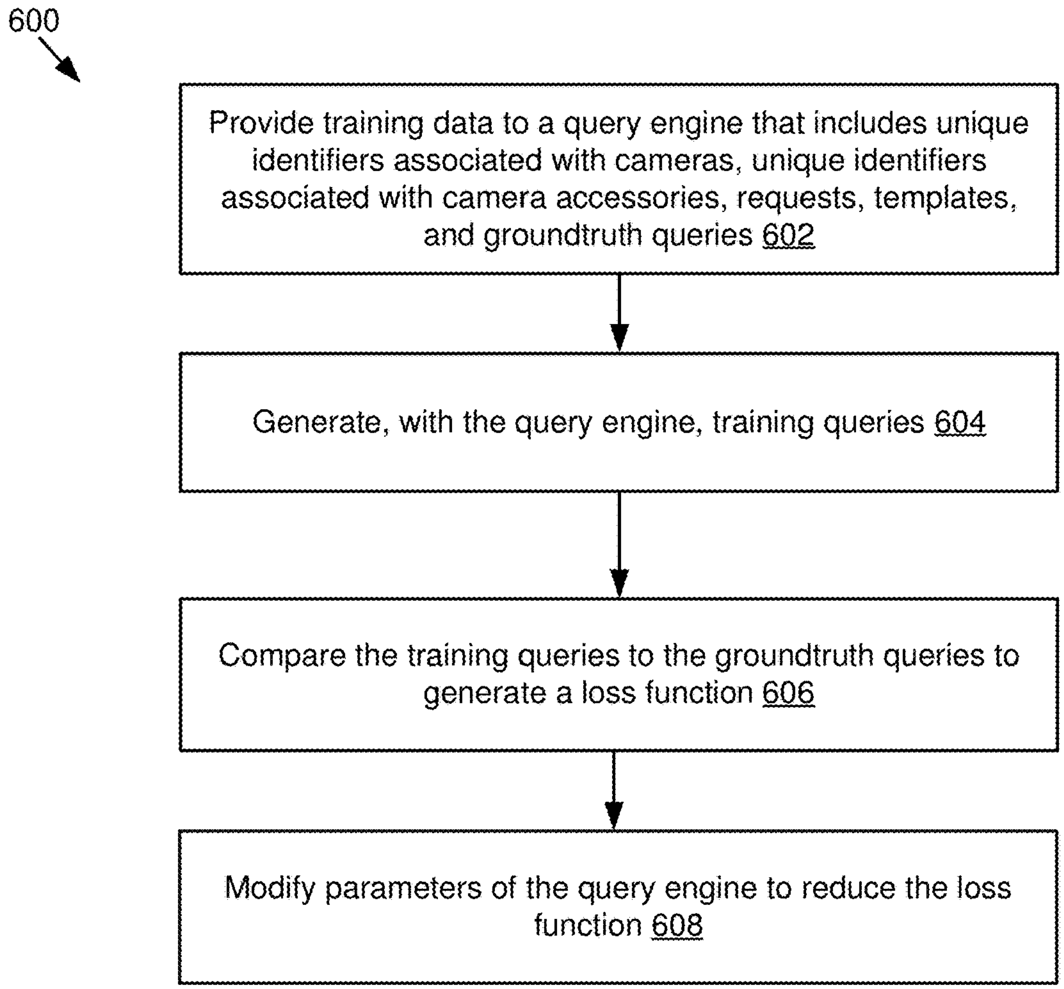
FIG. 6 includes a flowchart of an example method to train a machine-learning model to provide one or more optimization parameters according to some embodiments described herein.

FIG. 6 is a flowchart of an example method 600 to train a machine-learning model to output one or more optimization parameters. The method 600 is implemented by one or more computing devices 200 as described with reference to FIG. 2. The one or more computing devices 200 include the camera 127, the mobile device 117, and/or the server 101 as illustrated in FIG. 1.

The method 600 may start with block 602. At block 602, training data is provided to a query engine that includes unique identifiers associated with cameras, unique identifiers associated with camera accessories, requests, templates, and groundtruth queries. In some embodiments, the training data also includes input images. Block 602 may be followed by block 604.

At block 604, the query engine generates training queries. Block 604 may be followed by block 606.

At block 606, the training queries are compared to the groundtruth queries to generate a loss function. In some embodiments, the training further includes associating input images with corresponding optimization parameters and training the machine-learning model to identify optimization parameters based on different scenes, different lighting conditions, etc. Block 606 may be followed by block 608.

At block 608, parameters of the query engine are modified to reduce the loss function. For example, the loss function may determine a cross-entropy loss or an NCE loss. Block 608 may be followed by block 610.

FIG. 7 is a flowchart of an example method 700 to use a machine-learning model to output one or more optimization parameters. The method 700 is implemented by one or more computing devices 200 as described with reference to FIG. 2. The one or more computing devices 200 include the camera 127, the mobile device 117, and/or the server 101 as illustrated in FIG. 1.

The method 700 may start with block 702. At block 702, identifying information associated with a camera accessory 131 for a camera 127 is received. Block 702 may be followed by block 704.

At block 704, a unique identifier of the camera accessory 131 is determined based on the identifying information. Block 704 may be followed by block 706.

At block 706, the unique identifier of the camera accessory 131 and a unique identifier of the camera 127 are provided to a machine-learning model. Block 706 may be followed by block 708.

At block 708, the machine-learning model outputs one or more optimization parameters associated with the camera accessory 131 based on the unique identifier. The one or more optimization parameters guide a user on how to use the camera accessory 131 with the camera 127. The machine-learning model may be trained based on the method 600 described with reference to FIG. 6 above. Block 708 may be followed by block 710.

At block 710, graphical data for displaying a user interface that includes the one or more optimization parameters is generated. Block 710 may be followed by block 712.

At block 712, the one or more optimization parameters are applied. If the method 700 is performed on the camera 127, the camera 127 implements the optimization parameters. If the method 700 is performed on the mobile device 117, the mobile device 117 transmits a command to the camera 127.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end mobile devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A computer-implemented method comprising:

receiving an image of at least a portion of a camera accessory for a camera including identifying information associated with the camera accessory;

determining a unique identifier of the camera accessory based, at least in part, on the image;

providing the unique identifier of the camera accessory and a unique identifier of the camera to a machine-learning model;

outputting, with the machine-learning model, one or more optimization parameters associated with the camera accessory, wherein the one or more optimization parameters guide a user on how to use the camera accessory with the camera;

generating graphical data for displaying a user interface that includes the one or more optimization parameters; and applying the one or more optimization parameters.

2. The method of claim 1, wherein providing the unique identifier of the camera accessory and the unique identifier of the camera to the machine-learning model further includes providing an input image of a scene captured by the camera, wherein the one or more optimization parameters are associated with features from the input image.

3. The method of claim 1, wherein the one or more optimization parameters are selected from a group of a camera setting, a camera preset, a custom button, or combinations thereof.

4. The method of claim 1, wherein the camera accessory is a filter selected from a group of a neutral density filter, a color filter, a graduated density filter, an ultraviolet filter, and combinations thereof, and the method further comprises:

determining a shutter speed or a white balance of the camera, wherein the one or more optimization parameters include a camera setting that includes the shutter speed for the camera while the filter is attached to a lens of the camera.

5. The method of claim 1, wherein the camera accessory is a flash and the method further comprises:

determining a shutter speed of the camera, wherein the one or more optimization parameters include a camera setting that includes the shutter speed while the flash is associated with the camera.

6. The method of claim 1, wherein the user interface is provided on a mobile device, the mobile device is a separate piece of hardware from the camera, and the camera wirelessly communicates with the mobile device.

7. The method of claim 1, further comprising:

providing the user interface that includes the one or more optimization parameters as an option;

receiving modification of the one or more optimization parameters from the user;

receiving a selection from the user of the one or more modified optimization parameters, wherein applying the one or more optimization parameters occurs responsive to receiving the selection from the user; and responsive to a subsequent identification of the camera accessory, providing the modified optimization parameter as the option.

8. The method of claim 1, wherein the one or more optimization parameters include a first optimization parameter from a set of optimization parameters and the method further comprises:

providing the user interface that includes the set of optimization parameters as options;

receiving a selection of the first optimization parameter, wherein applying the one or more optimization parameters occurs responsive to receiving the selection from the user; and responsive to a subsequent identification of the camera accessory, providing the first optimization parameter as a default option.

9. The method of claim 1, wherein the camera accessory is a first camera accessory, the one or more optimization parameters are one or more first optimization parameters, and the method further comprises:

receiving identifying information associated with a second camera accessory for the camera;

determining a unique identifier of the second camera accessory based on the identifying information;

providing the unique identifier of the second camera accessory to the machine-learning model; and outputting, with the machine-learning model, one or more second optimization parameters associated with the second camera accessory based on the unique identifier and the one or more first optimization parameters.

10. A system comprising:

one or more processors; and logic encoded in one or more non-transitory media for execution by the one or more processors and when executed are operable to:

receive identifying information associated with a camera accessory for a camera;

determine a unique identifier of the camera accessory based on the identifying information;

provide the unique identifier of the camera accessory and a unique identifier of the camera to a machine-learning model;

output, with the machine-learning model, one or more optimization parameters associated with the camera accessory, wherein the one or more optimization parameters guide a user on how to use the camera accessory with the camera;

generate graphical data for displaying a user interface that includes the one or more optimization parameters as options;

receive via the user interface, a selection from the user of the one or more optimization parameters; and responsive to receiving the selection from the user, apply the one or more optimization parameters.

11. The system of claim 10, wherein providing the unique identifier of the camera accessory and the unique identifier of the camera to the machine-learning model further includes providing an input image of a scene captured by the camera, wherein the one or more optimization parameters are associated with features from the input image.

12. The system of claim 10, wherein the one or more optimization parameters are selected from a group of a camera setting, a camera preset, a custom button, or combinations thereof.

13. The system of claim 10, wherein the operations further include:

capturing the identifying information with a lens of the camera, wherein determining the identification of the camera accessory is based on an image of the camera accessory.

14. Software encoded in one or more non-transitory computer-readable media for execution by one or more processors and when executed is operable to:

receiving an image of at least a portion of a camera accessory for a camera including identifying information associated with the camera accessory;

determining a unique identifier of the camera accessory based, at least in part, on the image;

provide the unique identifier of the camera accessory and a unique identifier of the camera to a machine-learning model;

output, with the machine-learning model, one or more optimization parameters associated with the camera accessory, wherein the one or more optimization parameters guide a user on how to use the camera accessory with the camera;

generate graphical data for displaying a user interface that includes the one or more optimization parameters; and apply the one or more optimization parameters.

15. The software of claim 14, wherein providing the unique identifier of the camera accessory and the unique identifier of the camera to the machine-learning model further includes providing an input image of a scene captured by the camera, wherein the one or more optimization parameters are associated with features from the input image.

16. The software of claim 14, wherein the one or more optimization parameters are selected from a group of a camera setting, a camera preset, a custom button, or combinations thereof.

17. The software of claim 14, wherein the camera accessory is a filter selected from a group of a neutral density filter, a color filter, a graduated density filter, an ultraviolet filter, and combinations thereof, and the operations further include:

determining a shutter speed or a white balance of the camera, wherein the one or more optimization parameters include a camera setting that includes the shutter speed for the camera while the filter is attached to a lens of the camera.

* * * * *